United States Patent [19]
Vakil

[11] Patent Number: 5,491,618
[45] Date of Patent: Feb. 13, 1996

[54] LIGHT FIXTURE

[75] Inventor: Usman Vakil, Walnut, Calif.

[73] Assignee: Lights of America, Inc., Walnut, Calif.

[21] Appl. No.: 110,299

[22] Filed: Aug. 20, 1993

[51] Int. Cl.[6] ....................................................... F21S 1/02
[52] U.S. Cl. ........................... 362/147; 362/260; 362/363
[58] Field of Search ................................... 362/216, 260, 362/226, 147, 365, 404, 457, 363, 368

[56] References Cited

U.S. PATENT DOCUMENTS

| | | |
|---|---|---|
| 1,845,480 | 4/1928 | Clayton . |
| 2,191,292 | 10/1938 | Spence, Jr. . |
| 2,906,488 | 3/1954 | Wolar . |
| 3,198,462 | 5/1962 | Schultz . |
| 4,507,719 | 3/1985 | Quiogue ................................ 362/368 |
| 4,754,383 | 6/1986 | Klaus ..................................... 362/363 |
| 4,809,142 | 2/1989 | Auerbach ............................... 362/260 |
| 5,034,869 | 7/1991 | Choi ....................................... 362/363 |

FOREIGN PATENT DOCUMENTS

| | | |
|---|---|---|
| 253441 | 2/1964 | Australia . |
| 3643702 | 12/1986 | Germany . |
| 182097 | 8/1923 | United Kingdom . |
| 953243 | 3/1964 | United Kingdom ................... 362/216 |

OTHER PUBLICATIONS

The Effect of Modern Compact Fluorescent Lights on Voltage Distortion, by D. J. Pileggi, E. M. Gulachenski, C. E. Root, T. J. Gentile, A. E. Emanuel; date N/A.

Primary Examiner—Ira S. Lazarus
Assistant Examiner—Sara Sachie Raab
Attorney, Agent, or Firm—Graham & James

[57] ABSTRACT

A quick connect/disconnect light fixture which requires no tools to install or remove after the initial installation. The disclosed light fixture enables a typical consumer to convert a traditional incandescent light fixture to a fluorescent light fixture and to maintain the light fixture after it is installed.

11 Claims, 3 Drawing Sheets

LIGHT FIXTURE

FIELD OF THE INVENTION

The present invention is directed to a light fixture. More particularly, the invention is directed to a light fixture having a quick disconnect feature enabling simple and efficient replacement of a replaceable light assembly associated with the light fixture.

BACKGROUND OF THE INVENTION

In recent years, many homeowners have undertaken remodeling and home improvement projects on their own. Thus, there has been a surge in the number of "do it yourself" home-improvement products to allow the typical homeowner to undertake projects which would previously have required the assistance of skilled, and costly, craftsmen.

In addition, many consumers, homeowners in particular, are concerned with reducing their overall energy bills by reducing the amount of energy used in the home. It is well known that fluorescent lighting fixtures can provide energy and cost savings over incandescent lighting fixtures which produce the same amount of light. Thus, many consumers are having incandescent lighting fixtures replaced with fluorescent lighting fixtures.

While most consumers typically would feel comfortable changing a fluorescent light tube or incandescent light bulb should it burn out, a large percentage of consumers would not feel qualified replacing a fluorescent or incandescent light assembly should it need to be replaced. Such consumers would need to hire an electrician to replace the fixture. The expense of such a procedure could possibly negate the cost savings obtained by switching from incandescent to fluorescent lighting.

Thus, there is presently a need for a simple, efficient and cost effective fluorescent lighting fixture which allows the average consumer to personally replace the fluorescent light assembly.

SUMMARY OF THE INVENTION

The present invention is concerned with solving the above-noted difficulties with prior art lighting fixtures by providing a fluorescent lighting fixture having a quick disconnect feature which enables the consumer to quickly and easily remove the fluorescent light assembly from the fluorescent light fixture without the need for specialized tools or specialized knowledge of electrical wiring.

In addition, the fluorescent lighting fixture of the present invention is lightweight, decorative and energy efficient. Thus, the consumer is able to take advantage of energy saving fluorescent lighting technology without the potential costly problems associated with replacing prior art fluorescent lighting fixtures.

The above and other objects of the present invention will become more apparent in the following detailed discussion of the invention taken in consideration with the drawings, of which the following is a brief description.

DETAILED DESCRIPTION OF THE INVENTION

Figure 1:
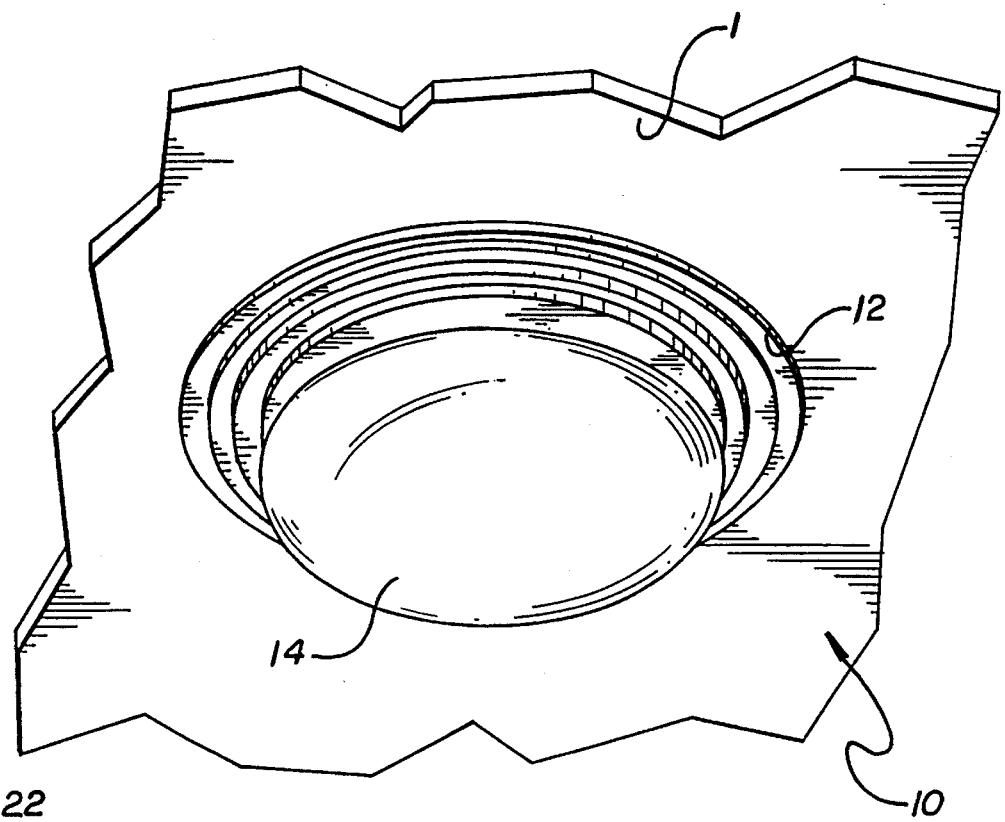
FIG. 1 shows a perspective view of a light fixture incorporating the present invention.

A detailed description of the present invention will now be presented in conjunction with the embodiment of the present invention illustrated in FIGS. 1–5. While the embodiment illustrated in FIGS. 1–5 is a preferred embodiment, it is to be understood that the present invention is in no way limited to the embodiment shown in the drawings.

FIGS. 1–5 show a ceiling or wall mounted fluorescent light fixture 10 mounted, for purposes of this description, to a ceiling 1. The lighting fixture 10 includes a decorative base plate 12 which is fixably mounted to a standard junction box (not shown) disposed in the ceiling 1. The decorative base plate 12 connects to the junction box with screws (not shown) which are inserted through openings 2 in the base plate. The electrical connections from the junction box pass through a circular opening 4 formed in the center of the base plate 12.

A cover 14, made of glass, plastic or other suitable material, mounts with the ceiling mounted base plate 12 and is held in place through raised projections 38 formed in an interior wall 40 of the base plate 12. The cover 14 includes an upper section 42 which mates with the inner wall 40 of the base plate 12.

Flat surface portions 44 formed on the upper section 42 of the cover 14 are aligned with the raised projections 38 formed on the inner wall surface 40 of the base plate 12. This enables the cover 14 to be pushed up into the base plate 12 until the lower, expanding portion 46 of the cover 14 contacts with the base plate 12. At this point, the cover 14 is turned clockwise and the raised portions 38 engage grooves 48 formed in the upper portion 42. The grooves 48 gradually decrease in size causing the cover 14 to be securely held in place by the base plate 12.

Referring in particular to FIGS. 2–5, mounted to the base plate 12 is a removable light assembly 15 which can include a fluorescent tube 16 which is held in place by a support bracket 17. The light assembly 15 includes a ballast circuit 18 disposed in a housing 19 which is covered by a cover 17A formed integral with the support bracket 17. The ballast circuit 18, which may be any suitable ballast circuit such as a magnetic or electronic ballast circuit, converts conventional power supplied via household wiring to a form suitable for use with the fluorescent tube 16.

An electrical connector 26 is coupled by wires 29 to the ballast circuit 18. The connector 26 mates with a connector 28 on the fluorescent tube 16 and is of standard construction. A reflector 30 serves to reflect the fluorescent light produced by the tube 16 outward from the base plate 12. In addition, reflector 30 serves as protection for the fluorescent light tube when the unit is shipped from the factory.

Figure 2A:
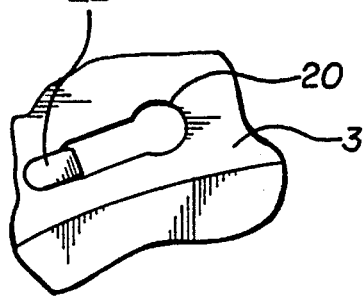
FIG. 2A is a detailed view showing a feature of the light fixture in FIG. 1.
Figure 2:
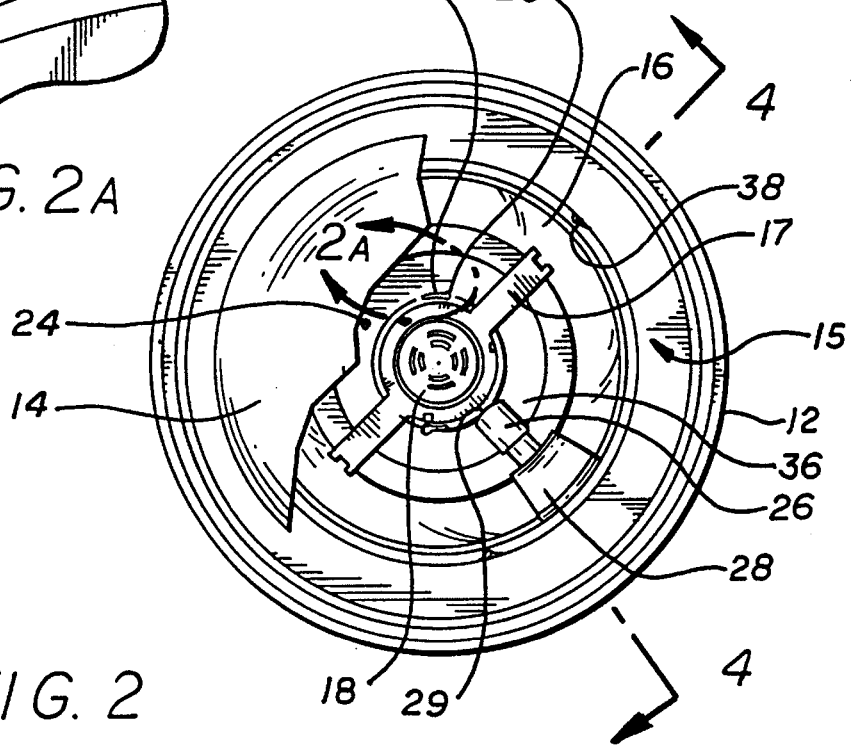
FIG. 2 is a cut away, bottom view of the light fixture shown in FIG. 1.
Figure 3:
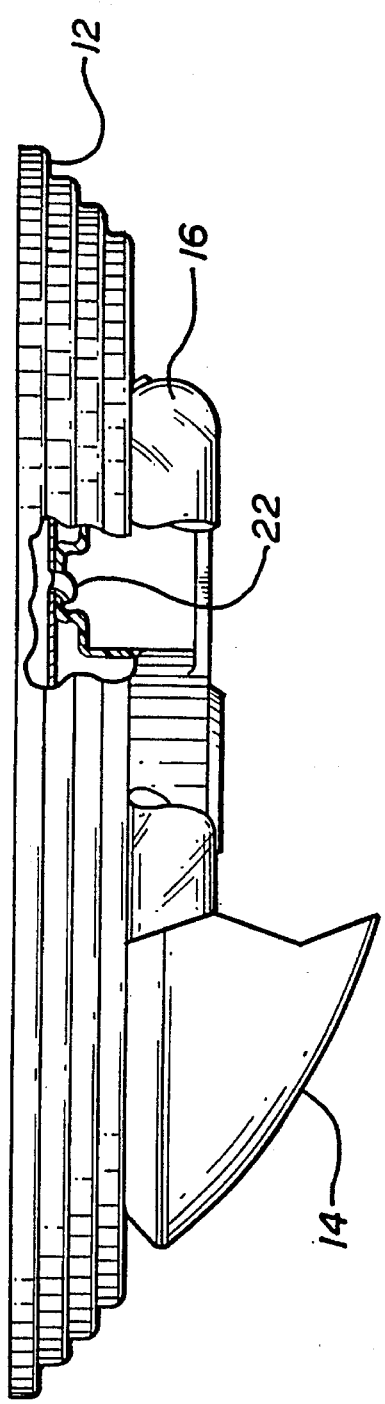
FIG. 3 is a side cut away view showing several of the details of the light fixture shown in FIG. 1.
Figure 4:
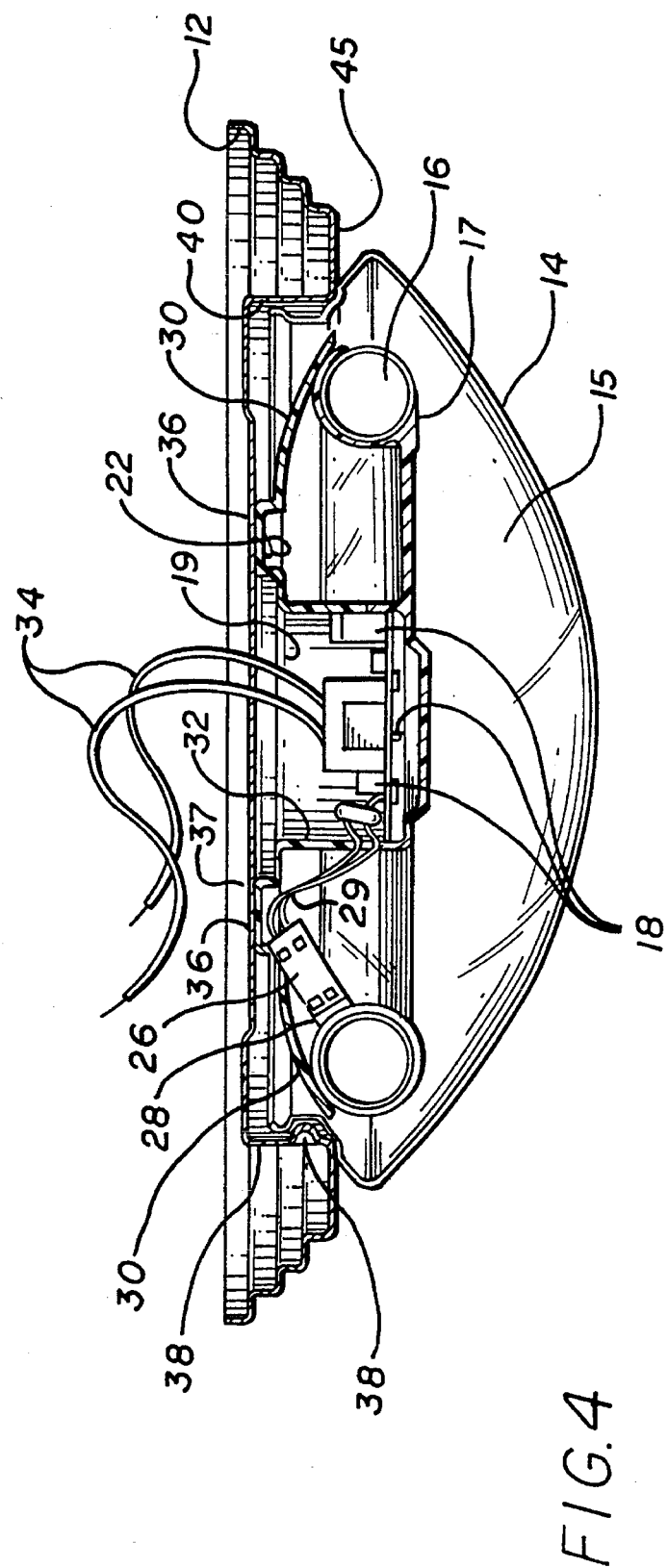
FIG. 4 is a side view of the light fixture shown in FIG. 1 taken along the line 4—4 shown in FIG. 2.
Figure 5:
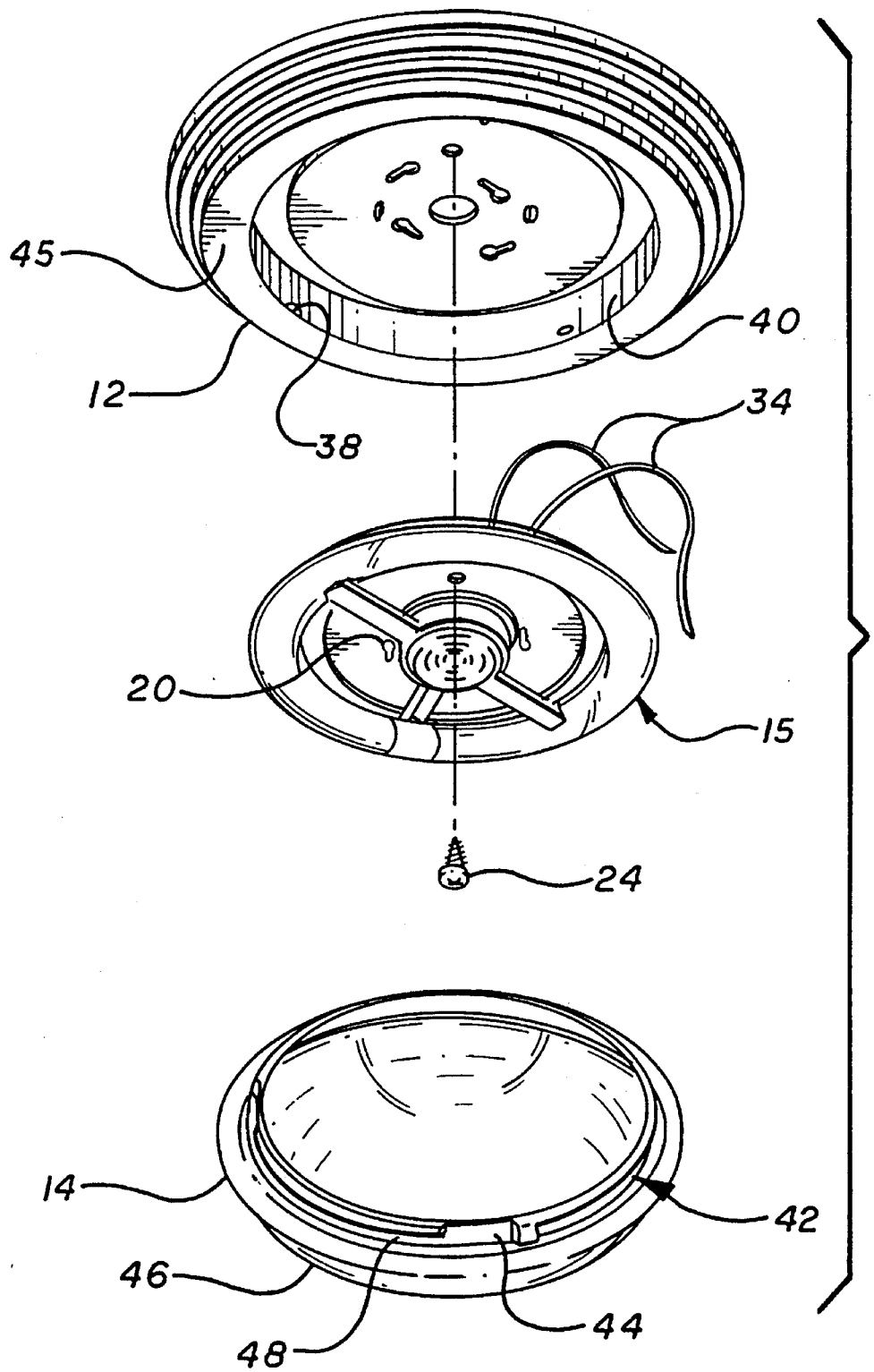
FIG. 5 is an exploded view of the light fixture shown in FIG. 1.

A circular upper surface 36 of reflector 30 is formed to mount flush with the interior bottom surface 37 of the base plate 12. The surface 36 has openings 20 formed therein. The openings 20 mate with projections 22 which depend from the interior bottom surface 37 of the base plate 12. A screw 24 may pass through reflector 30 and base plate 12. Detail of the mating interconnection can be seen in FIGS. 2A and 3. The mating arrangement of the upper surface 36 of the reflector with the bottom surface 37 of the base plate 12 provides the present invention with a simple, quick and secure method for supporting the light assembly 15. Alternatively, the projections 22 can be formed in the upper surface 36 of the light assembly 15 and the openings 20 may be formed on the base plate 12.

Installation and operation of the light fixture of the present invention is quite simple. Base plate 12 is mounted to a standard electrical junction box (not shown) in the ceiling 1 while the electrical wires from the household power supply are fed through the opening 4 formed in the base plate 12. The household ground wire (if provided) can be attached to one of the connection screws connecting the base plate to the junction box. The two wires 34 extending from the light assembly are connected to corresponding wires from the household supply extending through the opening 4.

The light assembly 15 is then lifted into position such that the openings 20 formed in the upper surface 36 thereof align with the projections 22 depending from the base plate 12 so that the projections 22 extend into the openings 20. The light assembly 15 is then turned until the projections 22 securely hold the fluorescent light assembly 15 in place. Note that as the light assembly 15 is brought into contact with the bottom surface 37 of the base plate 12, excess wiring may be carefully fed back through opening 4 so that it is stored in the junction box and does not interfere with the mating of the light assembly and the base plate.

The cover 14 is inserted into the base plate 12 so that the flat upper surfaces 44 align with the projections 38 formed on the inner wall 40 of the base plate 12. Cover 14 is then turned to securely fasten the cover 14 to the base plate 12.

As can be seen from the above discussion, the quick connect/disconnect feature of the present invention allows a consumer to simply and easily replace a burned out or malfunctioning light assembly 15 in a cost effective manner without requiring specialized tools or knowledge.

Finally, by making the system modular (e.g., the base plate 12, cover 14 and lighting assembly 15), the system provides an easily manufactured and maintained lighting system. In addition, such modularity allows for an integrated manufacturing process in which all of the components may be made in the most efficient, cost effective and time-saving manner possible.

For example, the base plate 12, which is preferably of metal construction but which can be any suitable material, can be simply and easily formed by stamping. The support bracket 17, ballast housing 19, housing cover 17A and reflector 30 can be easily formed using an injection molding process. Similarly, if a plastic cover 14 is used, it too can be made in a simple injection molding process. Thus, the components of the light fixture of the present invention can be made in a cost effective manner which allows the cost savings to be passed along to the consumer.

While the invention has been described in conjunction with a preferred embodiment, one skilled in the art would clearly recognize that the present invention is susceptible to modifications without departing from the spirit and scope of such an invention. For example, while the drawings illustrate a substantially circular lighting fixture, the shape thereof is in no way limited to illustrated structure.

Further, while the preferred embodiment utilizes two projections 22 which depend from the bottom surface 37 of the plate 12, one skilled in the art would clearly recognize that it is possible to increase the number of projections to secure the light assembly 15. Similarly, it is possible to provide both the base plate 12 and reflector 30 with a combination of projections and receptacles to provide for the interconnection of the light assembly 15 with the base plate 12. Applicants intend for all such modifications, including those not enumerated above, to fall within the scope of the claims which appear below.

What is claimed is:

1. A light fixture comprising:

a base plate fixably securable to at least one of a ceiling and a wall;

a light assembly including means for producing visible light, said light assembly including a flush mount surface; and connecting means for removably securing said flush mount surface of said light assembly to said base plate in abutting facing relationship, said connecting means including first and second portions, the first portion including a plurality of projections and the second portion including a plurality of receptacles, wherein said plurality of projections slidably engage a corresponding plurality of said plurality of receptacles to removably secure said light assembly to said base plate and wherein said plurality of projections depend from said base plate and said plurality of receptacles are disposed in said light assembly.

2. A light fixture according to claim 1, further including a cover slidably engagable with said base plate so as to cover said light assembly after said light assembly is removably secured to said base plate.

3. A light fixture according to claim 1, wherein said light assembly comprises reflector means for reflecting said visible light, a fluorescent light tube for generating said visible light, and a ballast circuit for providing an appropriate supply of power to said fluorescent light tube.

4. A light fixture according to claim 3, said light assembly further including a housing for containing said ballast circuit, said housing being formed integrally with said reflector means.

5. A light fixture according to claim 4, further including a support bracket for supporting said fluorescent tube, and a housing cover for covering said housing, said housing cover being formed integrally with said support bracket.

6. A light fixture according to claim 3, wherein said plurality of projections depend from said base plate and said plurality of receptacles are disposed in said reflector means.

7. A light fixture according to claim 3, wherein said plurality of projections are disposed on said reflector means and said plurality of receptacles are disposed in said base plate.

8. A light fixture comprising:

a base plate fixably securable to at least one of a ceiling and a wall;

a light assembly including means for producing visible light, said light assembly including a flush mount surface; and connecting means for removably securing said flush mount surface of said light assembly to said base plate in abutting facing relationship, said connecting means including first and second portions, the first portion including a plurality of projections and the second portion including a plurality of receptacles, wherein said plurality of projections slidably engage a corresponding plurality of said plurality of receptacles to removably secure said light assembly to said base plate and wherein said plurality of projections are disposed on said light assembly and said plurality of receptacles are disposed in said base plate.

9. A light fixture according to claim 8, further including a cover slidably engagable with said base plate so as to cover said light assembly after said light assembly is removably secured to said base plate.

10. A method for installing and removing a light fixture comprising the steps of:

fixably securing a base plate to at least one of a ceiling and a wall; and removably securing a light assembly including a flush mount surface to said base plate by slidably connecting a plurality of projections depending from said base plate to a corresponding plurality of receptacles disposed in said light assembly, such that said flush mount surface is in abutting facing relationship with said base plate.

11. A method according to claim 10, further including the step of slidably engaging a cover with said base plate, said cover being formed so as to cover said light assembly when said cover is engaged with said base plate.

* * * * *